(12) United States Patent
Mosier et al.

(10) Patent No.: US 10,712,234 B2
(45) Date of Patent: Jul. 14, 2020

(54) BELT AND PULLEY SYSTEMS AND METHODS OF DETECTING BELT DAMAGE

(71) Applicant: Purdue Research Foundation, West Lafayette, IN (US)

(72) Inventors: Kyle James Mosier, West Lafayette, IN (US); Gary W. Krutz, West Lafayette, IN (US); Robert Stwalley, Lafayette, IN (US); Grant Knies, Celestine, IN (US); Brittany Newell, Delphi, IN (US)

(73) Assignee: Purdue Research Foundation, West Lafayette, IN (US)

(*) Notice: Subject to any disclaimer, the term of this patent is extended or adjusted under 35 U.S.C. 154(b) by 303 days.

(21) Appl. No.: 15/549,769

(22) PCT Filed: Feb. 25, 2016

(86) PCT No.: PCT/US2016/019598
§ 371 (c)(1),
(2) Date: Aug. 9, 2017

(87) PCT Pub. No.: WO2016/138285
PCT Pub. Date: Sep. 1, 2016

(65) Prior Publication Data
US 2018/0045606 A1 Feb. 15, 2018

Related U.S. Application Data

(60) Provisional application No. 62/121,816, filed on Feb. 27, 2015.

(51) Int. Cl.
*G01M 13/023* (2019.01)
*F16H 9/12* (2006.01)
(Continued)

(52) U.S. Cl.
CPC .......... *G01M 13/023* (2013.01); *F16H 7/08* (2013.01); *F16H 7/14* (2013.01); *F16H 7/16* (2013.01);
(Continued)

(58) Field of Classification Search
CPC ..... F16H 7/16; F16H 7/14; F16H 7/08; F16H 9/12; G01M 13/023; F16G 1/28;
(Continued)

(56) References Cited

U.S. PATENT DOCUMENTS 4,758,213 A * 7/1988 Tanaka ................ F16G 1/00
474/264
4,854,446 A * 8/1989 Strader ................ B65G 43/02
198/810.02
(Continued)

FOREIGN PATENT DOCUMENTS

JP 09-060694 3/1997
JP 2003-014680 1/2003
(Continued)

OTHER PUBLICATIONS

International Search Report; PCT/US16/19598 dated May 18, 2016.

*Primary Examiner* — Jonathan M Dunlap
(74) *Attorney, Agent, or Firm* — Hartman Global IP Law; Gary M. Hartman; Domenica N. S. Hartman

(57) ABSTRACT

A system and method capable of detecting damage in a belt before catastrophic failure of the belt occurs. The system includes a belt having at least a first conductive component and/or at least a first dielectric component, and one or more pulleys to which the belt is mounted. At least a first of the pulleys has at least one conductive component that, in combination with the first conductive component or the first dielectric component of the belt, defines an electrical element. At least a portion of the electrical element is located (Continued)

within the belt so as to be physically responsive to transitory and permanent distortions of the belt resulting from extrinsic and/or intrinsic sources. Electrical potential is applied through the electrical element so as to generate an electrical signal from the electrical element corresponding to a physical response of the belt to a transitory and/or permanent distortion.

20 Claims, 9 Drawing Sheets

(51) Int. Cl.
| | |
|---|---|
| F16H 7/16 | (2006.01) |
| F16H 7/08 | (2006.01) |
| F16H 7/14 | (2006.01) |
| F16G 1/28 | (2006.01) |
| F16G 1/08 | (2006.01) |
| F16G 5/16 | (2006.01) |
| G01N 3/56 | (2006.01) |
| F16G 5/20 | (2006.01) |
| F16G 1/10 | (2006.01) |
| G01N 27/24 | (2006.01) |
| F16G 5/02 | (2006.01) |
| G01N 27/20 | (2006.01) |
| F16G 5/06 | (2006.01) |
| F16G 5/08 | (2006.01) |

(52) U.S. Cl.
CPC .......... *F16H 9/12* (2013.01); *F16G 1/08* (2013.01); *F16G 1/10* (2013.01); *F16G 1/28* (2013.01); *F16G 5/02* (2013.01); *F16G 5/06* (2013.01); *F16G 5/08* (2013.01); *F16G 5/166* (2013.01); *F16G 5/20* (2013.01); *G01N 3/56* (2013.01); *G01N 27/20* (2013.01); *G01N 27/24* (2013.01)

(58) Field of Classification Search
CPC ..... F16G 1/10; F16G 1/08; F16G 5/20; F16G 5/08; F16G 5/02; F16G 5/06; F16G 5/166; G01N 27/24; G01N 3/56
See application file for complete search history.

(56) References Cited

U.S. PATENT DOCUMENTS

| 5,212,982 | A | * | 5/1993 | Macchiarulo | G01N 27/20 324/700 |
|---|---|---|---|---|---|
| 5,307,672 | A | * | 5/1994 | Macchiarulo | G01N 3/56 324/456 |
| 5,351,530 | A | * | 10/1994 | Macchiarulo | G01N 27/20 474/268 |
| 6,181,239 | B1 | * | 1/2001 | Ahmed | F02B 77/081 340/438 |
| 6,523,400 | B1 | * | 2/2003 | Ahmed | G01M 13/023 73/114.77 |
| 6,532,810 | B1 | | 3/2003 | Ahmed | |
| 6,703,438 | B2 | * | 3/2004 | Hareyama | C01G 23/00 423/364 |
| 6,919,115 | B2 | * | 7/2005 | Foster | B29C 45/0013 428/292.1 |
| 6,943,672 | B2 | * | 9/2005 | Choi | G01M 13/023 116/208 |
| 7,025,699 | B2 | * | 4/2006 | Beck | F16G 1/08 156/137 |
| 7,235,028 | B2 | * | 6/2007 | Martin | B29D 29/08 474/264 |
| 7,521,009 | B2 | * | 4/2009 | Foster | B29C 45/0013 264/104 |
| 8,074,789 | B2 | * | 12/2011 | May | B65G 43/02 198/502.1 |
| 8,312,987 | B2 | * | 11/2012 | Lynn | G01M 13/023 198/810.02 |
| 8,604,776 | B2 | * | 12/2013 | Lynn | G01M 13/023 324/160 |
| 9,383,710 | B2 | * | 7/2016 | Miyazawa | G03G 15/757 |
| 9,514,576 | B2 | * | 12/2016 | Gerundt | B62J 99/00 |
| 9,829,066 | B2 | * | 11/2017 | Thomas | F16G 1/10 |
| 10,120,321 | B2 | * | 11/2018 | Mori | F16G 1/00 |
| 2002/0187869 | A1 | * | 12/2002 | Martin | B29D 29/08 474/260 |
| 2003/0129350 | A1 | * | 7/2003 | Foster | B29C 45/0013 428/64.1 |
| 2004/0222546 | A1 | * | 11/2004 | Foster | B29C 45/0013 264/104 |
| 2009/0011691 | A1 | * | 1/2009 | L'Helgoualc'H | B24B 9/00 451/296 |
| 2009/0176609 | A1 | * | 7/2009 | Lehtovaara | F16D 41/206 474/112 |
| 2009/0178902 | A1 | * | 7/2009 | Lynn | G01M 13/023 198/810.02 |
| 2009/0303065 | A1 | * | 12/2009 | Lipowski | B65G 43/02 340/679 |
| 2015/0277338 | A1 | * | 10/2015 | Hamada | G03G 15/757 399/167 |
| 2015/0277339 | A1 | * | 10/2015 | Miyazawa | G03G 15/757 399/167 |
| 2015/0285334 | A1 | * | 10/2015 | Thomas | F16G 1/10 474/90 |
| 2017/0371290 | A1 | * | 12/2017 | Mori | F16G 1/00 |

FOREIGN PATENT DOCUMENTS

| JP | 2005-201408 | 7/2005 |
|---|---|---|
| KR | 10-0169630 | 1/1999 |

* cited by examiner

A-A

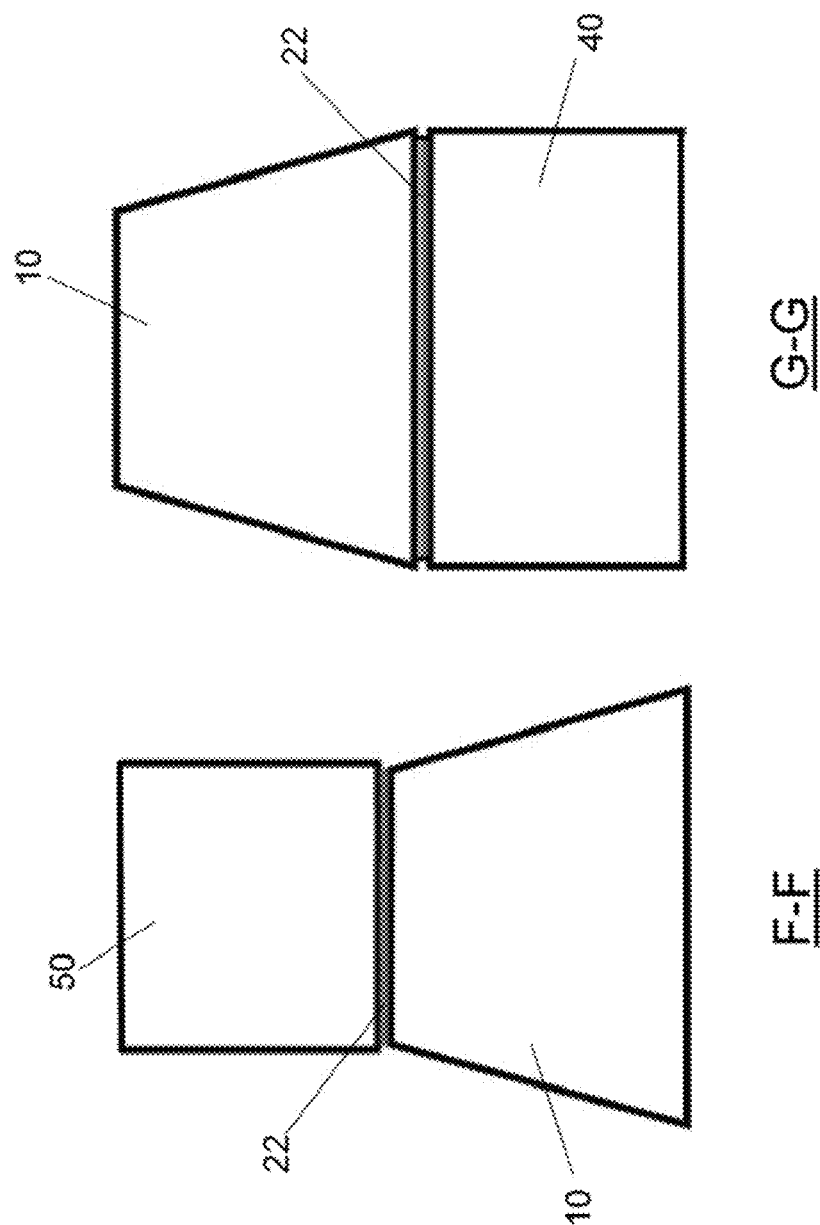

BELT AND PULLEY SYSTEMS AND METHODS OF DETECTING BELT DAMAGE

CROSS REFERENCE TO RELATED APPLICATIONS

This application claims the benefit of International Application No. PCT/US2016/019598, filed Feb. 25, 2016, which claims the benefit of U.S. Provisional Application No. 62/121,816, filed Feb. 27, 2015.

BACKGROUND OF THE INVENTION

The present invention generally relates to belts of types used to convey or transmit motion, power and/or objects. The invention particularly relates belt and pulley systems and methods for detecting wear or damage to a belt prior to failure thereof.

Belt and pulley systems are used in many applications to convey or transmit motion, power and/or objects. As used herein, a belt and pulley system will be understood to comprise one or more belts interconnected by two or more pulleys, with the term "belt" understood to encompass a wide variety of flexible belts and the term "pulley" understood to encompass a wide variety of pulleys, sheaves, wheels, etc. The failure of a belt may have a much greater impact than simply downtime to stop machinery to replace the belt. Many applications that require the use of belts are in industries that can suffer serious setbacks in the event of a catastrophic belt failure, and would therefore benefit from the use of a technology to detect damage to a belt before catastrophic failure occurs.

Current technologies for belt monitoring typically examine conditions that are known to cause damage to a belt. For example, systems exist for monitoring the alignment of a belt during its operation. There are other systems adapted to monitor the tension of a belt or monitor slippage between a belt and the pulley system on which the belt operates. Still other technologies exist that are capable of collecting and analyzing visual data to determine if a belt has suffered damage. There are also belt monitoring products that monitor conditions within a belt. One such product utilizes lateral rip sensors that are built into a belt and are monitored as the sensors pass over a sensor. Systems also exist that are capable of monitoring steel cords within a belt as the cords pass over a sensor.

Despite the existence of the above-noted technologies, there is an ongoing desire for systems and methods capable of detecting damage, abnormalities, etc., in a belt, preferably before catastrophic failure of the belt occurs.

BRIEF DESCRIPTION OF THE INVENTION

The present invention provides systems and methods capable of detecting damage, abnormalities, etc., in belts adapted to convey or transmit motion, power and/or objects, and preferably to detect damage, abnormalities, etc., before catastrophic belt failure occurs.

According to one aspect of the invention, a belt and pulley system is provided that has an integral life-sensing capability. The system includes a belt having at least a first conductive component and/or at least a first dielectric component, and one or more pulleys to which the belt is mounted. At least a first of the one or more pulleys has at least one conductive component that, in combination with the first conductive component or the first dielectric component of the belt, defines an electrical element chosen from the group consisting of capacitive and resistive elements. At least a portion of the electrical element is located within the belt so as to be physically responsive to transitory and permanent distortions of the belt resulting from extrinsic and/or intrinsic sources. The system is configured to apply an electrical potential through the electrical element so as to generate an electrical signal from the electrical element corresponding to a physical response of the belt to a transitory and/or permanent distortion.

According to another aspect of the invention, a method of sensing the life of a belt mounted to one or more pulleys includes providing the belt to have at least a first conductive component and/or at least a first dielectric component, and providing at least a first of the one or more pulleys to have at least one conductive component that, in combination with the first conductive component or the first dielectric component of the belt, defines an electrical element chosen from the group consisting of capacitive and resistive elements, wherein at least a portion of the electrical element is located within the belt so as to be physically responsive to transitory and permanent distortions of the belt resulting from extrinsic and/or intrinsic sources. The method further includes applying an electrical potential with at least the first pulley and through the electrical element so as to generate an electrical signal from the electrical element corresponding to a physical response of the belt to a transitory and/or permanent distortion.

Technical effects of the method and system described above preferably include the ability to detect impending belt failure and provide warnings in order to avoid catastrophic belt failures that might otherwise interfere with or halt productivity in a variety of applications and industries.

Other aspects and advantages of this invention will be better appreciated from the following detailed description.

BRIEF DESCRIPTION OF THE DRAWINGS

FIG. 12 schematically represents cross-sectional views taken along lines F-F and G-G of FIG. 11 and shows the belt engaged with two of the pulleys.

DETAILED DESCRIPTION OF THE INVENTION

Figure 1:
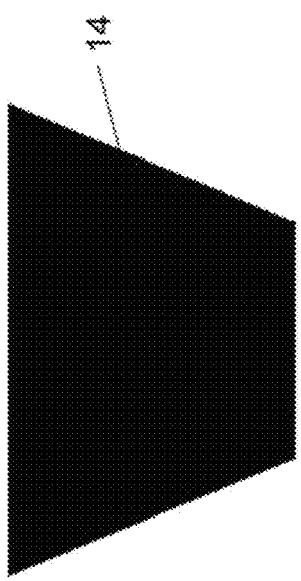
FIG. 1 schematically represents a cross-sectional view of a nonlimiting belt comprising a dielectric material suitable for use in systems in accordance with certain aspects of the present invention.

Pulley systems and methods disclosed herein use capacitance, resistance, inductance, or a combination thereof whose detected values can be used to determine a physical condition of a belt, for example, belt stretch, tension, partial failure, etc. As an example, a belt can be configured to exhibit a capacitance that changes when the belt has been damaged due to changes that occur in the dielectric constant of the belt material, in the thickness of a dielectric layer within the belt, or in the interfaces between different materials within the belt. Many different types of damage from various extrinsic and intrinsic sources can affect these factors, for example, permanent distortions such as cracking, layer separation, and burning, as well as transitory distortions that over time will result in permanent distortions. If such a change is detected, a user can be alerted that the belt's integrity has been compromised and should be replaced. For convenience, consistent reference numbers are used throughout the drawings to identify the same or functionally equivalent elements.

According to a preferred aspect of the invention, one or more pulleys (which includes sheaves, wheels, etc.) of a pulley system can be configured and utilized to assist in the detection of a change in capacitance, resistance, and/or inductance of a belt. With the application of a suitable electrical potential, such a pulley system enables a change in capacitance, resistance, and/or inductance to be detected and generate a signal that can be interpreted by to a data acquisition device that monitors the signal. The pulley may be configured to impede the signal everywhere except where the signal is transferred. The data acquisition device can then be used to receive the signal and, based on characteristics of the signal, detect and/or identify a change in capacitance, resistance, and/or inductance as an indicator of an impending failure of the belt, in which case the data acquisition device may be adapted to provide a warning to a user or system prior to an actual failure of the belt occurring.

FIGS. 1 through 4 represent nonlimiting embodiments of belts 10a, 10b, 10c, and 10d of types that can be employed with pulley systems encompassing certain aspects of the invention, and FIGS. 5 through 12 schematically represent nonlimiting embodiments of pulley systems 100, 200, 300 and 400 comprising pulleys (sheaves) 20, 30, 40 and 50 on which one or more of the belts 10a, 10b, 10c, and 10d (collectively identified with reference number 10 in FIGS. 5 through 12) can be installed. The belts 10a, 10b, 10c, and 10d are schematically represented in FIGS. 1 through 4 and the pulley systems 100, 200, 300 and 400 are schematically represented in FIGS. 5 through 12 for the purpose of describing certain aspects of the invention, and therefore it should be understood that various other belt and pulley system configurations are also within the scope of the invention, and such belts and pulley systems can be configured for use in a variety of applications, for example, to convey or transmit motion, power and/or objects. In each case, the belt 10 and one or more of its associated pulleys 20, 30, 40 and 50 define an electric circuit/element that utilizes dielectric and/or conductive components within the belt 10 and conductive components of the associated pulley(s) 20, 30, 40 and/or 50. The pulley(s) 20, 30, 40 and/or 50 is/are adapted to apply an electric potential to the belt 10 by which changes in capacitance, resistance, and/or inductance of the electric circuit can be sensed, indicative of the physical condition of the belt 10. It is foreseeable and within the scope of the invention that the electrical potential may be applied by a component other then one of the pulley(s) 20, 30, 40, and/or 50. In combination, the belts 10 and their associated pulley(s) 20, 30, 40 and/or 50 are preferably capable of use in a monitoring system that is able to electronically detect a defect in the belt 10 due to cord failure, layer separation, surface damage, etc. Typically of particular interest will be the tension cord region of a belt, which on belts of the types depicted (V-belts having trapezoidal cross-section shapes) will come into contact with a pulley on which the belt is installed.

In the schematic cross-sectional representations of FIGS. 1 through 4, lighter-shaded portions of the belts 10a, 10c and 10d represent a dielectric material (a nonlimiting example being rubber), and darker-shaded portions of the belts 10b, 10c and 10d represent a conductive material (a nonlimiting example being conductive rubber). It is within the scope of the invention that the belts 10a, 10b, 10c and 10d may comprise any number of additional conductive, dielectric, reinforcement, or other materials and components.

Figure 2:
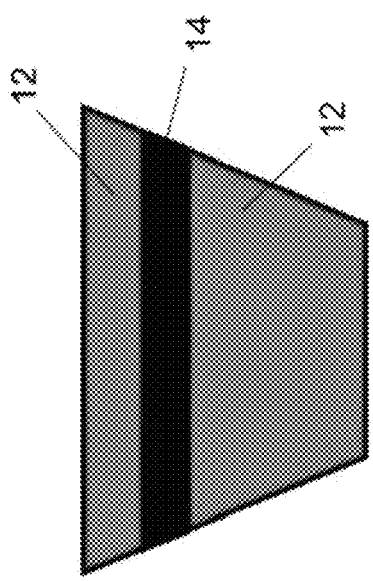
FIG. 2 schematically represents a cross-sectional view of another nonlimiting belt comprising a conductive material suitable for use in systems in accordance with certain aspects of the present invention.

FIG. 1 represents a fully dielectric belt 10a, e.g., formed entirely of a dielectric material or at least exhibiting dielectric properties throughout its cross-sectional area. The entire belt 10a defines a dielectric layer 12 that can be employed as a component (insulator) of a capacitor whose capacitance changes due to internal or external damage to the belt 10a. FIG. 2 represents a fully conductive belt 10b, e.g., formed entirely of an electrically conductive material or at least exhibiting electrically conductive properties throughout its cross-sectional area. The entire belt 10b defines a conductor layer 14 as a component of the belt 10b whose electrical resistance changes due to internal or external damage to the belt 10b.

Figure 3:
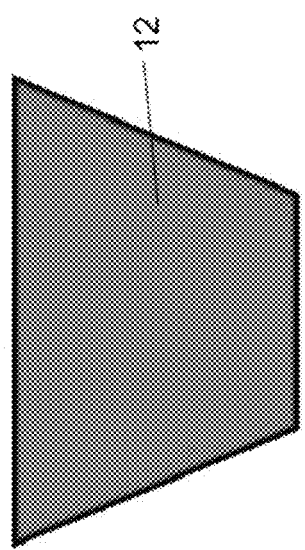
FIGS. 3 and 4 schematically represent cross-sectional views of two nonlimiting belts comprising both dielectric and conductive materials suitable for use in systems in accordance with certain aspects of the present invention.

FIG. 3 represents a composite belt 10c having top and bottom conductive layers 14 formed of one or more conductive materials, and a dielectric layer 12 therebetween that is formed of one or more dielectric material and located within a tension cord region of the belt 10c. The dielectric and conductive layers 12 and 14 can be employed as components (insulator and electrodes) of a fully integrated capacitor whose capacitance changes due to internal or external damage to the belt 10c, primarily within the dielectric tension cord region of the belt 10c as a result of changes occurring in the dielectric layer 12 that alter its dielectric properties.

Figure 4:
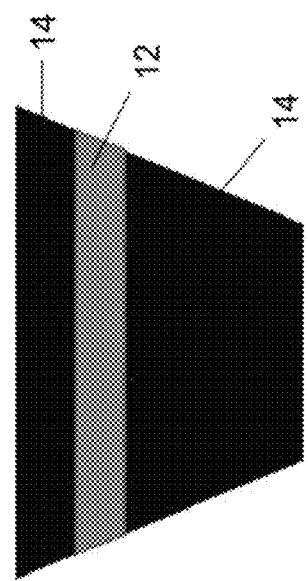

FIG. 4 represents a composite belt 10d having top and bottom dielectric layers 12 of one or more dielectric materials, and a conductive layer 14 therebetween that is formed of one or more conductive materials and located within a tension cord region of the belt 10d. The dielectric and conductive layers 12 and 14 can be employed as components (insulator and electrodes) of a capacitor. In this embodiment, the conductive layer 14 can serve as a conductive electrode of the capacitor, and a pulley can be employed to define at least one additional conductive electrode to complete a capacitor whose capacitance changes due to internal or external damage to the belt 10*d*, primarily within the top and/or bottom dielectric layers 12 of the belt 10*d*.

Figure 5:
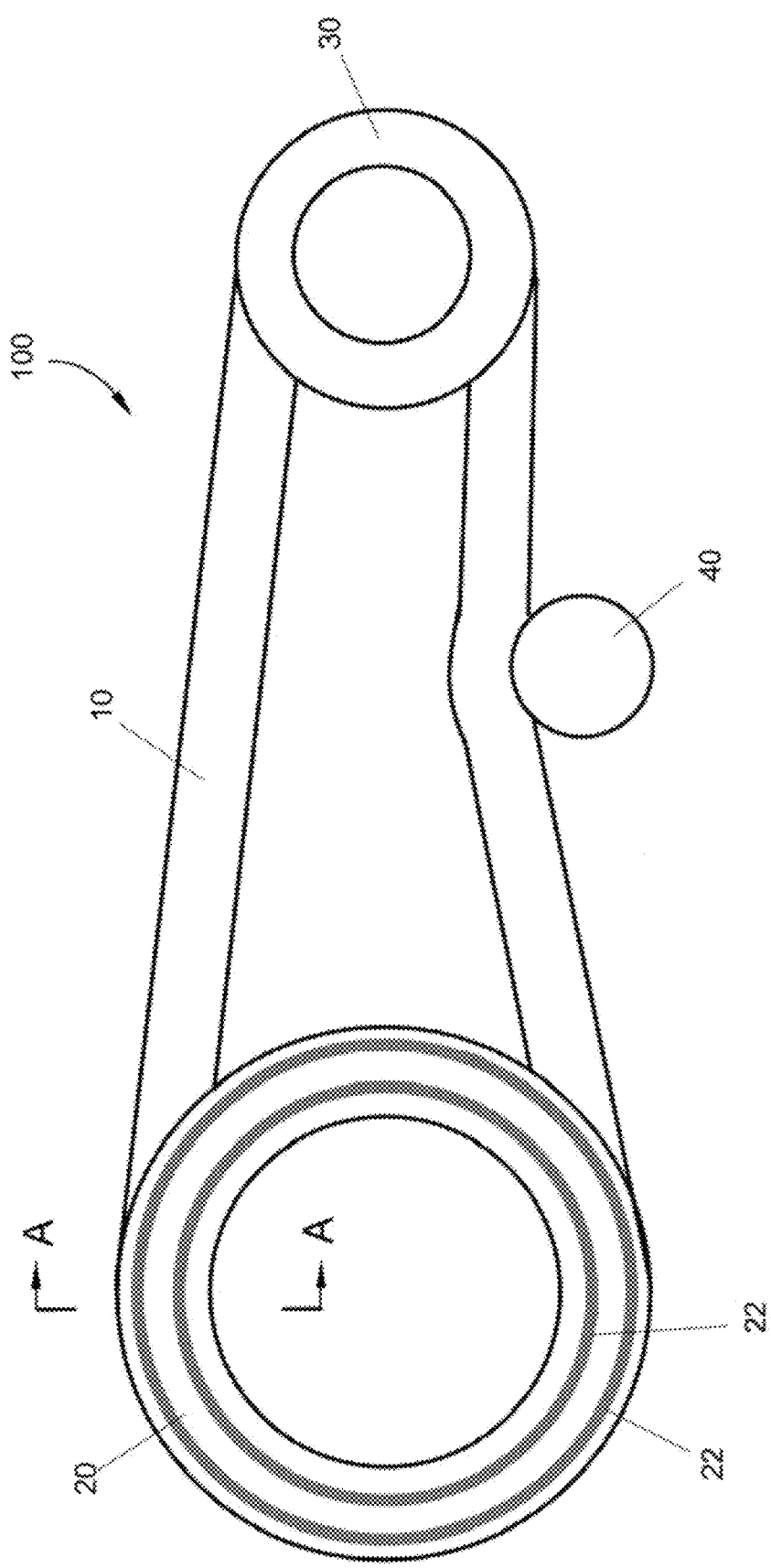
FIG. 5 schematically represents a nonlimiting pulley system suitable for detecting capacitance, resistance, inductance, or a combination thereof in cooperation with a belt in accordance with certain aspects of the present invention.
Figure 6:
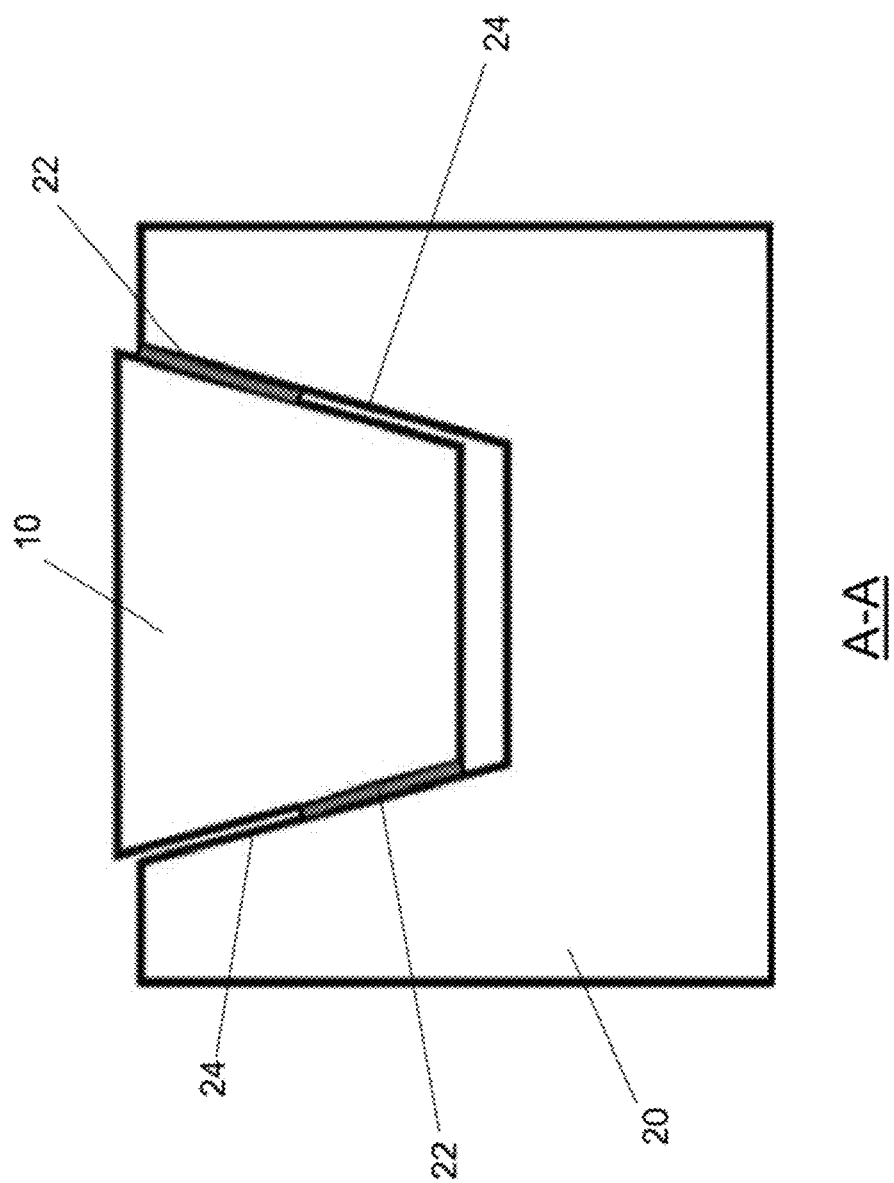
FIG. 6 schematically represents a cross-sectional view taken along line A-A of FIG. 5 and shows the belt engaged with one of the pulleys.

The nonlimiting pulley system 100 of FIGS. 5 and 6 is schematically represented as comprising three pulleys 20, 30 and 40, one of which serves as an idler pulley 40. The pulley 20 is schematically represented as having conductors 22 formed of a conductive material (e.g., copper) on opposing interior walls 24 of a groove thereof that are in contact with the belt 10 during operation. By utilizing any suitable means capable of applying an electrical potential across the conductors 22 of the pulley 20, an electrical signal can be generated with the electrical element (e.g., capacitor, resistor, inductor) defined by the material(s) of the belt 10 and the conductors 22 on the pulley 20, with such a signal being capable of being processed and interpreted by a suitable data acquisition device to indicate a physical response of the belt 10 to a transitory and/or permanent distortion. In the embodiment represented in FIGS. 5 and 6, signal values (capacitance, resistance, inductance, or a combination thereof) may be detected laterally across the width of the belt 10, through a depth of the belt 10, or a combination thereof between the opposing interior walls 24 of the pulley 20. As shown, the values can be detected from an upper portion on one lateral side of the belt 10 (adjacent one of the conductors 22) to a lower portion on the opposite lateral side of the belt 10 (adjacent the other conductor 22), as represented in FIG. 6. The system 100 is particularly adapted, but not limited to, use in combination with the fully dielectric belt 10*a* of FIG. 1, the fully conductive belt 10*b* of FIG. 2, the composite belt 10*c* of FIG. 3 having top and bottom conductive layers 14 and the dielectric layer 12 therebetween, and the composite belt 10*d* of FIG. 4 having top and bottom dielectric layers 12 and the conductive layer 14 therebetween.

Figure 7:
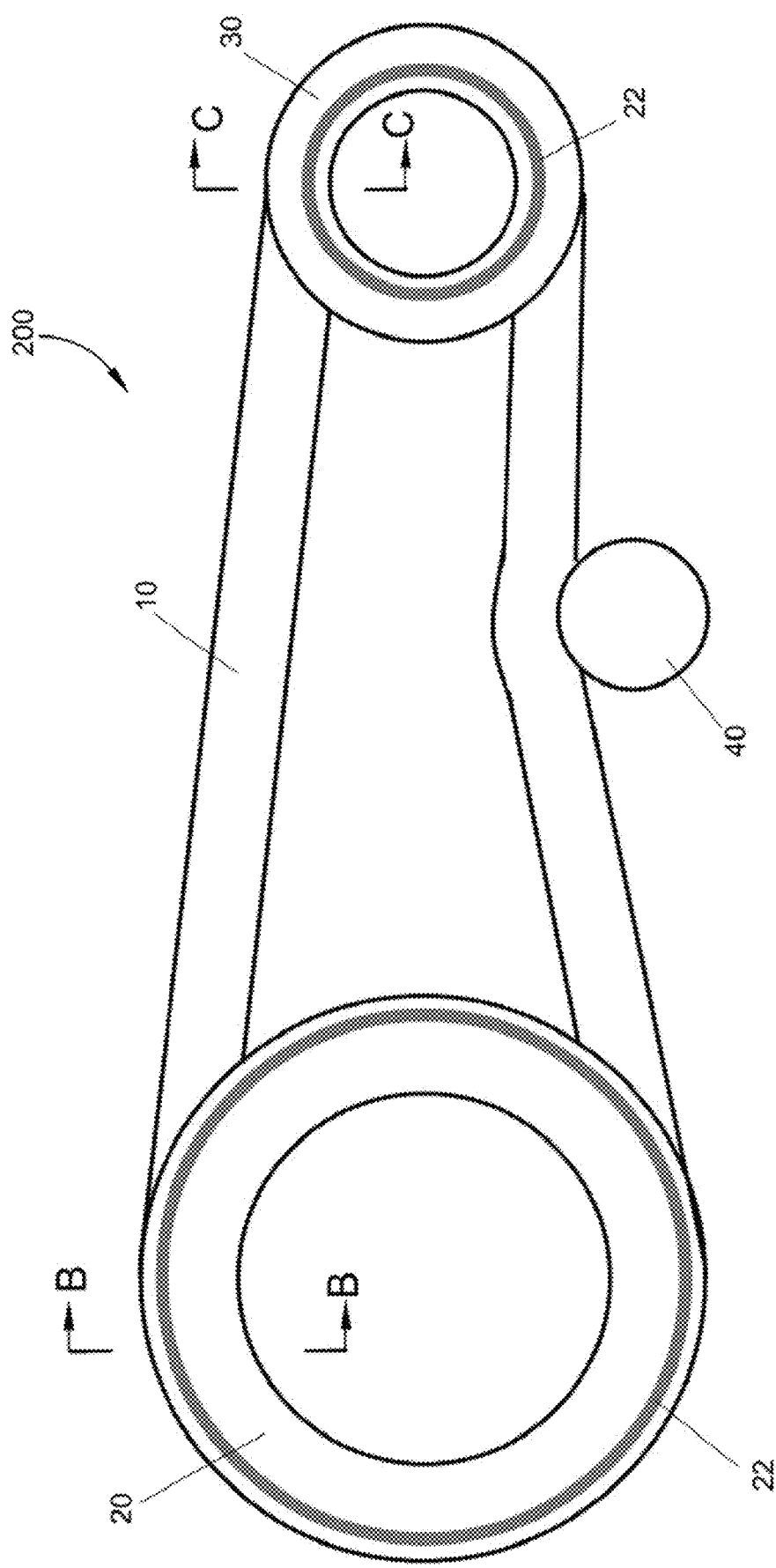
FIG. 7 schematically represents another nonlimiting pulley system suitable for detecting capacitance, resistance, inductance, or a combination thereof in cooperation with a belt in accordance with certain aspects of the present invention.
Figure 8:
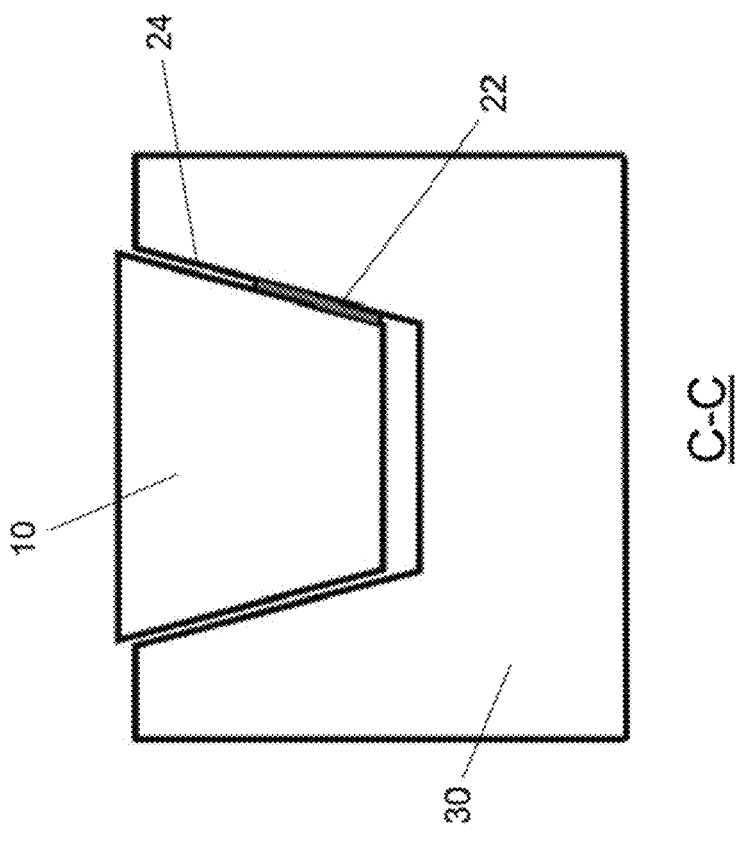
FIG. 8 schematically represents cross-sectional views taken along lines B-B and C-C of FIG. 7 and shows the belt engaged with two of the pulleys.
Figure 8:
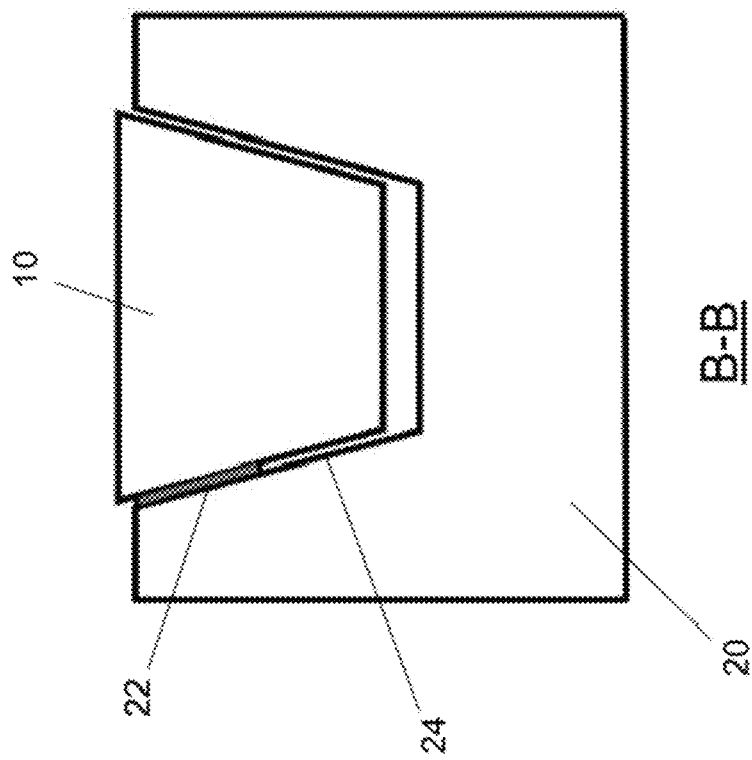

The nonlimiting pulley system 200 of FIGS. 7 and 8 is also schematically represented as comprising three pulleys 20, 30 and 40, one of which serves as an idler pulley 40. In FIGS. 7 and 8, two of the pulleys 20 and 30 are schematically represented as having conductors 22 formed of a conductive material. In contrast to FIGS. 5 and 6, each pulley 20 and 30 may have a single conductor 22 on one of its interior walls 24, wherein the conductors 22 are located to contact a different lateral side of the belt 10 during operation. With the application of an electrical potential across the conductors 22 of the different pulleys 20 and 30, signal values (capacitance, resistance, inductance, or a combination thereof) may be detected simultaneously laterally through the cross-section (width) of the belt 10 and also along the length of the belt 10 between the pulleys 20 and 30. In the configuration shown, signal values can be detected between an upper portion on one lateral side of the belt 10 that contacts the conductor 22 of the pulley 20, and a lower portion on the opposite lateral side of the belt 10 that contacts the conductor 22 of the pulley 30, as evident from FIG. 8. The system 200 is particularly adapted, but not limited to, use in combination with the fully dielectric belt 10*a* of FIG. 1, the fully conductive belt 10*b* of FIG. 2, the composite belt 10*c* of FIG. 3 having top and bottom conductive layers 14 and the dielectric layer 12 therebetween, and the composite belt 10*d* of FIG. 4 having top and bottom dielectric layers 12 and the conductive layer 14 therebetween.

Figure 9:
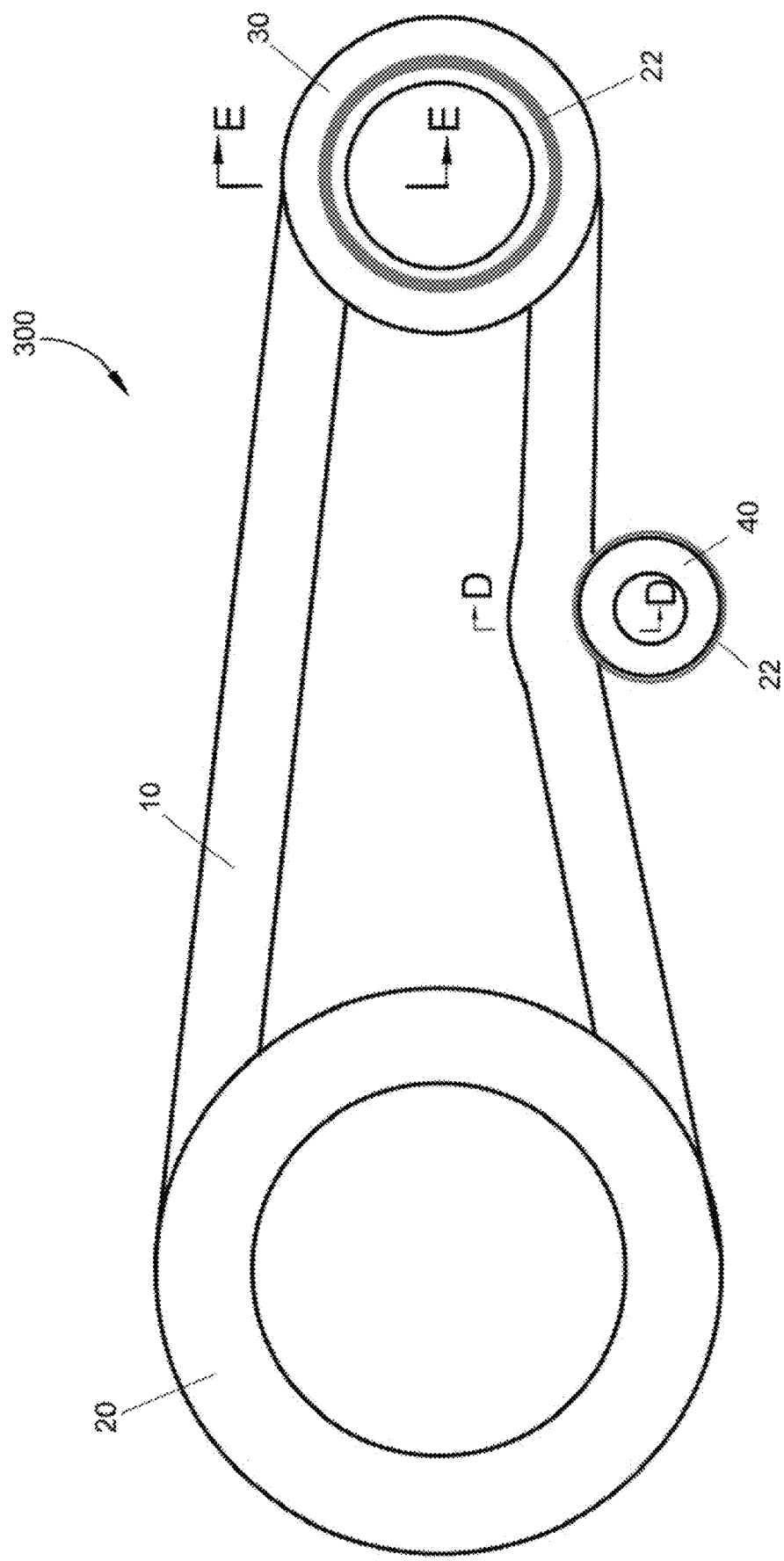
FIG. 9 schematically represents another nonlimiting pulley system suitable for detecting capacitance, resistance, FIG. 10 schematically represents cross-sectional views taken along lines D-D and E-E of FIG. 9 and shows the belt engaged with two of the pulleys.
Figure 10:
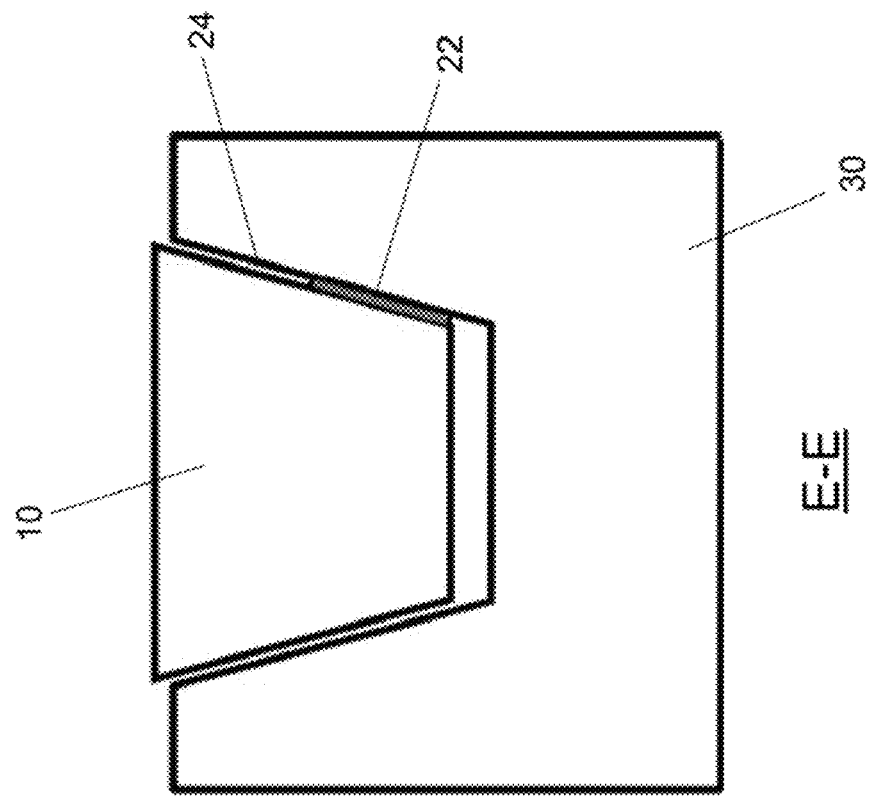
Figure 10:
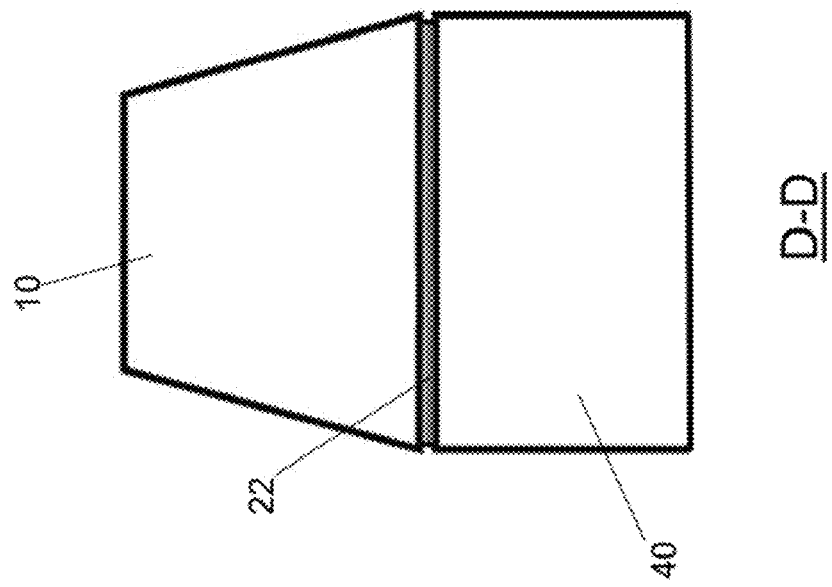

The nonlimiting pulley system 300 of FIGS. 9 and 10 is similar to that of FIGS. 5 through 8, in that the system 300 is schematically represented as comprising two pulleys 20 and 30 and an idler pulley 40. In FIGS. 9 and 10, the pulley 30 is schematically represented as having a conductor 22 formed of a conductive material on one of its interior walls 24, and the idler pulley 40 is schematically represented as having a conductor 22 formed of a conductive material on its surface that contacts the wider nonlateral side of the belt 10, such that each conductor 22 contacts a different surface (at a lateral side or a nonlateral side) of the belt 10 during operation. With the application of an electrical potential across the conductors 22 of the different pulleys 30 and 40, signal values (capacitance, resistance, inductance, or a combination thereof) may be detected along the length of the belt 10 between the idler pulley 40 and the pulley 30 and diagonally through the belt 10 between its wider nonlateral side and one of its lateral sides, preferably in a region of the lateral side remote from the wider nonlateral side of the belt 10 contacted by the idler pulley 40 as represented in FIG. 10. As represented in FIGS. 9 and 10, the system 300 is particularly adapted for use in combination with the belts 10*a* and 10*b* represented in FIGS. 1 and 2, though it should be appreciated that the system 300 could be used in combination with any of the belts 10*a*, 10*b*, 10*c* and 10 represented in FIGS. 1 through 4 by appropriately locating the conductor 22 on the pulley 30.

Figure 11:
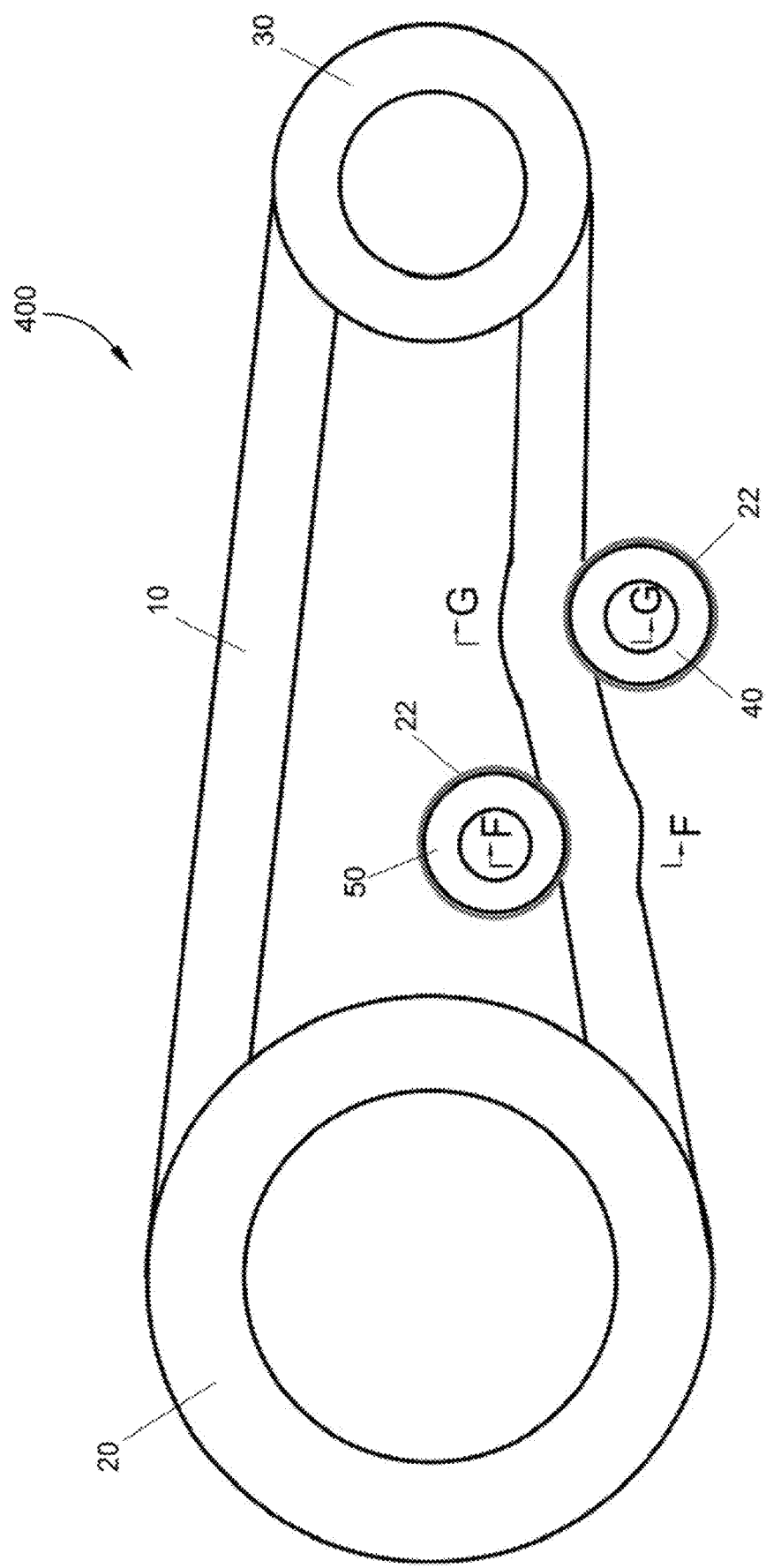
FIG. 11 schematically represents another nonlimiting pulley system suitable for detecting capacitance, resistance, inductance, or a combination thereof in cooperation with a belt in accordance with certain aspects of the present invention.

The nonlimiting pulley system 400 of FIGS. 11 and 12 is schematically represented as comprising two pulleys 20 and 30 and two idler pulleys 40 and 50, with each idler pulley 40 and 50 having a conductor 22 on an exterior surface thereof. The conductors 22 of the idler pulleys 40 and 50 contact the wider and narrower nonlateral sides, respectively, of the belt 10, such that the conductors 22 contact two oppositely-disposed surfaces of the belt 10 during operation. With the application of an electrical potential across the conductors 22 of the different pulleys 40 and 50, signal values (capacitance, resistance, inductance, or a combination thereof) may be detected through the thickness (height) of the belt 10 between its wider and narrower nonlateral sides, and along the length of the belt 10 between the pair of idler pulleys 40 and 50, as represented in FIG. 12. This system 400 is particularly adapted for, but not limited to, use in combination with the fully dielectric belt 10*a* or the fully conductive belt 10*b*, such as the types represented in FIGS. 1 and 2, though it should be appreciated that the system 400 could be adapted for use with any of the belts 10*a*, 10*b*, 10*c* and 10 represented in FIGS. 1 through 4.

Systems of the types described above can be employed in the operation of conveyor and power transmission equipment to warn of an impending belt failure with enough advance notice to safely shut down the equipment prior to belt failure. Such a system may also be adapted to collect temporal data regarding the physical condition of the belt for future management, planning, and technological development purposes.

In view of the above, systems utilizing belts and pulleys of the types described above can be utilized to avoid catastrophic belt failures that might otherwise halt productivity in a range of applications and industries. In particular, such a system preferably serves to monitor belts and allow for their removal when damaged but before catastrophic failure. Belts of the types described herein can also be advantageous to belt manufacturers in terms of being able to monitor quality control. For example, a belt can undergo a quality check before leaving the factory, reducing the risk that the belt manufacturer will ultimately be held responsible for damages that may be a consequence of a belt having a defect that is difficult to detect.

While prior art approaches for monitoring belts for misalignment and incorrect tensioning can help avoid damage to a belt, such approaches do not enable the monitoring of the belt itself for the detection of damage or the prediction of when the belt needs to be replaced. Similarly, the ability to monitor belt slippage does not detect actual damage to a belt, but simply provides an indication that the belt needs to be re-tensioned. In contrast, systems equipped with belts and pulleys as described above are capable of providing the capability to monitor tension (through transitory distortions associated therewithin) and damage (permanent distortions) simultaneously. Collecting visual data of the exterior of a belt cannot provide an indication as to whether an internal issue within the belt may cause the belt to fail, whereas the belts and pulleys described above are specifically intended to detect internal damage and flaws that cannot be seen from the exterior of the belt. Lastly, systems utilizing the belts and pulleys described above are capable of monitoring the entire length of a belt during its operation, and allow for the use of detection and data acquisition means that can be relatively inexpensive.

The invention is not limited to the systems and pulleys illustrated and described herein. It is foreseeable and within the scope of the invention that a system could have any number of pulleys or other structural features in contact with a belt that are configured to electrically detect changes in capacitance, resistance, inductance, or a combination thereof through at least a portion of the belt in order to identify wear or damage to the belt. Furthermore, belts, pulleys, etc., could be used that differ from those shown, such as conveyer belts, serpentine belts, and various types of pulleys and pulley systems. In addition, pulleys, belts, conductors, etc., may be formed of any material suitable for achieving their respective functional purposes, including their desired electrically conductive or dielectric properties.

Therefore, while the invention has been described in terms of specific embodiments, it is apparent that other forms could be adopted by one skilled in the art, and the scope of the invention is to be limited only by the following claims.

The invention claimed is:

1. A belt and pulley system having an integral life-sensing capability, the system comprising:
   a belt having a width defined by and between oppositely-disposed first and second lateral sides of the belt, a depth defined by and between oppositely-disposed first and second nonlateral sides of the belt, and at least a first conductive component and/or at least a first dielectric component;
   one or more pulleys to which the belt is mounted, at least a first of the one or more pulleys having at least a first conductor that contacts the first lateral side or the first nonlateral side of the belt; and
   a second conductor that contacts the second lateral side or the second nonlateral side of the belt and, in combination with the first conductor of the first pulley and the first conductive component or the first dielectric component of the belt, defines an electrical element chosen from the group consisting of capacitive and resistive elements, at least a portion of the electrical element being located within an interior region of the belt so as to be physically responsive to transitory and permanent distortions of the belt resulting from extrinsic and/or intrinsic sources; and
   wherein an electrical potential applied with the first and second conductors is through the electrical element and between the first lateral side or the first nonlateral side of the belt contacted by the first conductor and the second lateral side or the second nonlateral side of the belt contacted by the second conductor so as to generate an electrical signal from the electrical element and with the first conductive component and/or the first dielectric component thereof corresponding to a physical response of the belt to a transitory and/or permanent distortion.

2. The belt and pulley system of claim 1, wherein the belt consists of the first conductive component.

3. The belt and pulley system of claim 1, wherein the belt consists of the first dielectric component.

4. The belt and pulley system of claim 1, wherein the belt comprises both the first conductive component and the first dielectric component.

5. The belt and pulley system of claim 1, wherein the first pulley comprises the first conductor on a first interior wall of the first pulley and the second conductor on a second interior wall of the first pulley oppositely disposed from the first interior wall, and the portion of the electric element located within the belt is located entirely across the width of the belt, and through a portion of the depth of the belt, between the first and second interior walls of the first pulley.

6. The belt and pulley system of claim 1, further comprising a second of the one or more pulleys having the second conductor thereon, wherein the portion of the electric element is located within the belt along a length of the belt between the first conductor of the first pulley and the second conductor of the second pulley.

7. The belt and pulley system of claim 6, wherein the portion of the electric element located within the belt is located entirely across the width of the belt, through a portion of the depth of the belt, and along the length of the belt between the first and second pulleys.

8. The belt and pulley system of claim 6, wherein the portion of the electric element located within the belt is located diagonally through the belt between the first nonlateral side of the belt and the second lateral side of the belt and along the length of the belt between the first and second pulleys, so that the electrical potential is applied diagonally through the belt and along the length of the belt between the first and second pulleys.

9. The belt and pulley system of claim 6, wherein the portion of the electric element located within the belt is located entirely through the depth of the belt between the first and second nonlateral sides of the belt and along the length of the belt between the first and second pulleys.

10. A method of sensing the life of a belt using the belt and pulley system of claim 1, the method comprising:
    applying an electrical potential with at least the first pulley and through the electrical element so as to generate an electrical signal from the electrical element corresponding to a physical response of the belt to a transitory and/or permanent distortion;
    monitoring the electrical signal; and
    removing the belt from the belt and pulley system before catastrophic failure of the belt based on the electrical signal.

11. A method comprising:
    providing a belt having a width defined by and between oppositely-disposed first and second lateral sides of the belt, a depth defined by and between oppositely-disposed first and second nonlateral sides of the belt, and at least a first conductive component and/or at least a first dielectric component; and
    applying an electrical potential through the belt to perform a quality check on the belt, the electrical potential being applied between the first and second lateral sides of the belt or the first and second nonlateral sides of the belt so as to be applied entirely across the width or the depth of the belt and through an electrical element that comprises the first conductive component and/or the first dielectric component, at least a portion of the electrical element being located within an interior region of the belt and generating an electrical signal to detect damage or a defect in the belt prior to use thereof.

12. A method comprising:
providing a belt having a width defined by and between oppositely-disposed first and second lateral sides of the belt, a depth defined by and between oppositely-disposed first and second nonlateral sides of the belt, and at least a first conductive component and/or at least a first dielectric component;
installing the belt on a system comprising at least a first pulley having a first conductor that contacts the first lateral side or the first nonlateral side of the belt, and a second conductor that contacts the second lateral side or the second nonlateral side of the belt and, in combination with the first conductor of the first pulley and the first conductive component or the first dielectric component of the belt, defines an electrical element chosen from the group consisting of capacitive and resistive elements, at least a portion of the electrical element being located within an interior region of the belt so as to be physically responsive to transitory and permanent distortions of the belt resulting from extrinsic and/or intrinsic sources; and
applying an electrical potential with the first and second conductors through the electrical element and between the first lateral side or the first nonlateral side of the belt contacted by the first conductor and the second lateral side or the second nonlateral side of the belt contacted by the second conductor so as to generate an electrical signal from the electrical element and with the first conductive component and/or the first dielectric component thereof corresponding to a physical response of the belt to a transitory and/or permanent distortion.

13. The method of claim 12, wherein the belt comprises both the first conductive component and the first dielectric component.

14. The method of claim 12, wherein the electrical potential is applied either entirely across the width of the belt between the first lateral side of the belt contacted by the first conductor and the second lateral side of the belt contacted by the second conductor or entirely across the depth of the belt between the first nonlateral side of the belt contacted by the first conductor and the second nonlateral side of the belt contacted by the second conductor.

15. The method of claim 12, wherein the first pulley comprises the first conductor on a first interior wall of the first pulley and the second conductor on a second interior wall of the first pulley oppositely disposed from the first interior wall, and the electrical potential is applied entirely across the width of the belt, and through a portion of the depth of the belt, between the first and second interior walls of the first pulley.

16. The method of claim 12, wherein the electrical potential is applied through the belt and along a length of the belt between the first conductor of the first pulley and the second conductor located on a second pulley.

17. The method of claim 16, wherein the electrical potential is applied entirely across the width of the belt, through a portion of the depth of the belt, and along the length of the belt between the first and second pulleys.

18. The method of claim 16, wherein the electrical potential is applied diagonally through the belt between the first nonlateral side of the belt and the second lateral side of the belt and along the length of the belt between the first and second pulleys.

19. The method of claim 16, wherein the electrical potential is applied entirely through the depth of the belt between the first and second nonlateral sides of the belt and along the length of the belt between the first and second pulleys.

20. The method of claim 12, further comprising:
detecting an impending failure of the belt based on the electrical signal; and
providing a warning prior to the failure of the belt.

* * * * *